United States Patent [19]
Betheil

[11] Patent Number: 5,454,350
[45] Date of Patent: Oct. 3, 1995

[54] ELECTRONIC DIALING ATTACHMENT FOR A PET COLLAR

[76] Inventor: Stephen M. Betheil, 11 Deer Trail, Clarksburg, N.J. 08510

[21] Appl. No.: 39,752

[22] Filed: Mar. 30, 1993

[51] Int. Cl.$^6$ ............................................. A01K 29/00
[52] U.S. Cl. .......................................................... 119/858
[58] Field of Search ............................. 119/858, 850, 119/856; 379/355, 356

[56] References Cited

U.S. PATENT DOCUMENTS

| | | | |
|---|---|---|---|
| 3,495,229 | 2/1970 | Kuehnle | 379/356 X |
| 4,081,116 | 3/1978 | Fliegelman | 224/5 A |
| 4,208,986 | 9/1986 | Costanzo | 40/21 R |
| 4,612,719 | 6/1980 | de Jong | 119/106 |
| 4,763,355 | 8/1988 | Cox | 379/355 |
| 4,882,750 | 11/1989 | Aenderson et al. | 379/356 X |
| 4,941,172 | 7/1990 | Winebaum et al. | 379/355 |
| 4,980,910 | 12/1990 | Oba et al. | 379/355 |
| 5,054,051 | 10/1991 | Hoff | 379/356 |
| 5,109,803 | 5/1992 | Dunham et al. | 119/106 |
| 5,181,744 | 1/1993 | Betheil | 379/355 X |

FOREIGN PATENT DOCUMENTS 283260  11/1988  Japan ..................... 379/355

Primary Examiner—Gene Mancene
Assistant Examiner—Thomas Price
Attorney, Agent, or Firm—Plevy & Associates

[57] ABSTRACT

An electronic dialing attachment is adapted to be secured to a pet collar or other band member worn by a pet and includes a holder body having a channel for receiving a programmable dialing element. The dialing element is programmable to store a telephone dialing sequence corresponding to the telephone number of the owner of the pet and is detachably coupled to the holder body. If the pet is lost, the dialing element is adapted to be detached from the holder body and positioned near the handset of a telephone by the finder of the lost pet. The dialing element is actuable to generate a touch tone signal, thereby permitting the owner of the lost pet to be contacted without delay.

19 Claims, 2 Drawing Sheets

ELECTRONIC DIALING ATTACHMENT FOR A PET COLLAR

FIELD OF THE INVENTION

The invention concerns an electronic dialing element detachably coupled to a holder assembly, and more particularly to a dialing element and holder assembly which are securable to a collar or other flexible band worn by a pet so that if the pet is lost, its owner can be quickly and easily contacted.

BACKGROUND OF THE INVENTION

The use of straps and collars as a means of fastening license tags and tags indicating compliance with local health regulations are well known in the art. The license tag, for example, is generally secured to the collar by means of a clip or split-ring fastener and often comprises the sole means of identifying the pet who has been lost or otherwise separated from his owner. In such cases, the individual finding the lost pet must bring the animal to his or her home, contact the license issuing authority, and wait for the owner to be contacted. If the pet is found at night or over a weekend, it may take many hours or even days before the issuing authority can be contacted.

To avoid the shortcomings of relying on a license tag as the sole means of owner identification, it has also been suggested that a tag bearing the name and address of the owner be fixed to the collar of the pet. While such tags could potentially expedite the owner notification process, there are still several certain disadvantages. The major problem with such identification tags, of course, is that upon reading the owner's telephone number from the tag, the finder must memorize the telephone number or hope that the lost pet will remain in the area while he gets a pencil and paper to write it down. As the pet is most likely to wander off, the fact that pet identification tags often do not fulfill their intended purpose is generally overlooked. Further, in this age of a high regard for privacy, it is unlikely that pet owners, given a choice, would desire strangers to arbitrarily know their name, address, and telephone number. Accordingly, it can be seen that a need exists for a simple electronic device securable to the pet which makes it possible for the finder of the lost pet to quickly contact the owner with minimal effort while maintaining the owner's expectations of privacy to the greatest extent possible.

Electronic devices which are capable of storing a desired telephone dialing sequence and generating a touch tone signal corresponding thereto are well known. Such devices are placed near a telephone handset and actuated to dial the desired telephone number.

Also available are electronic monitoring devices which attach to an animal's collar or band and which permit the location of the animal to be detected. One such device is disclosed in U.S. Pat. No. 4,612,719. In the '719 patent, an integral holder/buckle defines a rib and a cavity for receiving an electronic responder device. A flap pivotally connected to the holder includes a boss positioned opposite the rib. An end of a band is positioned between the holder and the flap so that when the flap is closed, the band is compressed between the boss and the rib and thereby held in place.

U.S. Pat. No. 4,081,116 discloses a holder assembly which is adapted to detachably secure a gaff hook to a flexible band or belt. The '116 patent utilizes a holder defining a longitudinal channel for retaining a portion of the band and having a pair of parallel plate members positioned over the channel. The plate members define a slot therebetween for receiving the gaff hook and one of them is equipped with a detent portion which flexes to admit the rounded surface of the hook as it is inserted. The detent returns to a hook engaging position and locks the hook in place.

British Patent No. 278,477 shows a device for adjusting the girth of a dog collar having belt holes. The '477 device includes a baseplate having a stud for engaging a hole in a belt or the holes of overlapped ends of the belt. A hinged cover is closed down over the overlapped ends of the belt to secure the belt after the adjustment for girth has been made.

U.S. Pat. No. 4,208,986 to Costanzo discloses a deodorizing collar attachment which comprises a housing formed from upper and lower arcuate members pivotally joined at one end. The upper member has a downwardly depending lip which is adapted to engage the outer periphery of the lower member, thereby securing the two members together. The upper member is pivoted to expose the interior of the housing and the contents, thereby allowing the deodorizing chemicals freely retained therein to be replaced.

None of the patents discussed above, however, suggest a holder assembly provided with means coupled to a band member such as a collar adapted to be worn by a pet for detachably retaining an electronic device capable of reproducing a desired dialing sequence corresponding to the telephone number of the owner of a lost pet.

Accordingly, it is an object of the present invention to provide a programmable device that can be secured to the collar worn by the pet, that can be readily detached therefrom, and that can be positioned near any telephone handset so that the finder of a lost pet wearing said device can establish telephone contact with the owner quickly and easily.

SUMMARY OF THE INVENTION

The aforementioned object, as well as other objects, advantages, and features of the present invention that may become apparent through the subsequent descriptions thereof, is accomplished by an assembly securable to a collar or other band member worn by a pet which includes dialing means for reproducing a desired dialing sequence corresponding to a telephone number of the owner, holder means for securing the dialing means to the band member, and retaining means for detachably coupling the dialing means to the holder means.

The retaining means are operable in a first position to secure the dialing means within a channel formed on the surface of the holder means and in a second position to uncouple the dialing means therefrom. The dialing means may be removed from the channel when the retaining means is operated to uncouple the dialing means. In one embodiment, the retaining means is a sidewall portion of the channel movable to engage a surface of the dialing means in a force fitting manner. In a slightly modified embodiment, the retaining means further comprises a projection formed on the channel sidewall portion and adapted to engage a surface of the dialing means in a force fitting manner. Alternatively, the dialing means may be modified to include a movable latching portion thereon which is adapted to engage with a surface of the channel in a force fitting manner.

In order to secure the holder means to the band member or collar, the holder means defines a second channel which receives a portion of the band member. The band member is retained between a base portion of the second channel and the bottom surface of the dialing means when the dialing means is in a retained position.

The dialing means preferably includes programmable memory means operable to store in memory the desired dialing sequence and means for generating a touch tone communication signal corresponding to the stored sequence. Means for initiating reproduction of the stored dialing sequence are also provided so that if the dialing means is removed from the holder means and placed near a telephone handset the owner's telephone number can be dialed simply by actuating the initiating means. Inputting means are also provided to facilitate manual programming of the desired dialing sequence.

DESCRIPTION OF THE INVENTION

Figure 1:
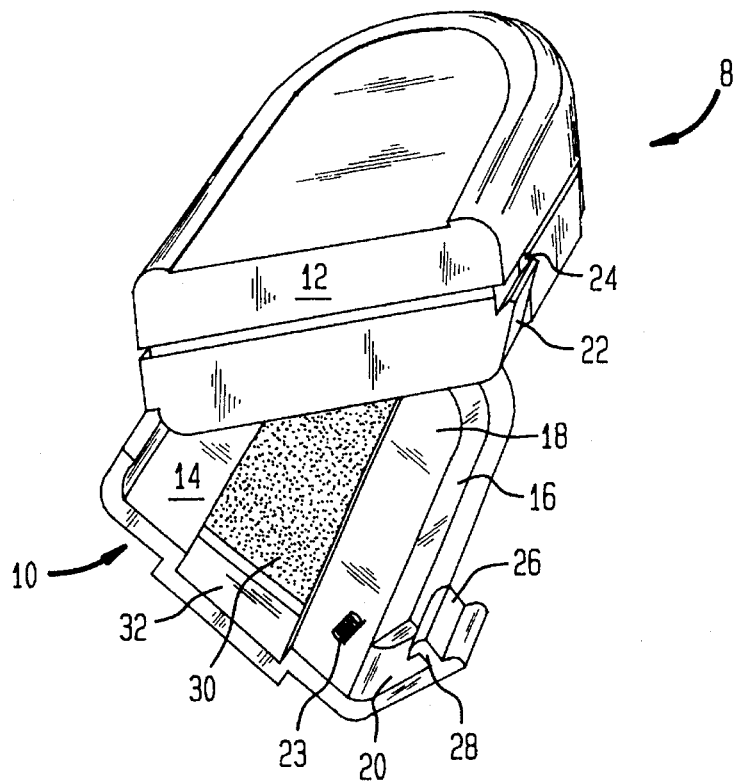
FIG. 1 is a perspective view of a dialing element detachably coupled to a holder assembly in accordance with the present invention.

With reference now to FIG. 1, the electronic pet collar attachment of the present invention is generally indicated at 8. A collar mounted holder body 10 is dimensioned to receive an electronic dialing element 12 and includes a base portion 14 and at least one sidewall 16 extending upwardly therefrom to define a channel 18. The dialing element 12 is dimensioned so that it may be placed within channel 18 and secured therein as shown in FIGS. 2 and 3.

Figure 2:
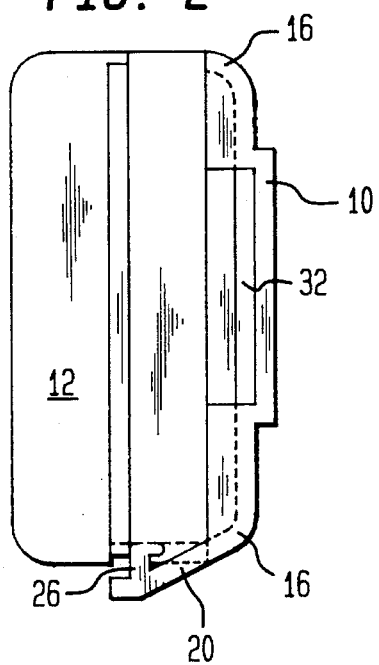
FIG. 2 is a side view of the embodiment of FIG. 1 showing the dialing element secured within the holder assembly.
Figure 3:
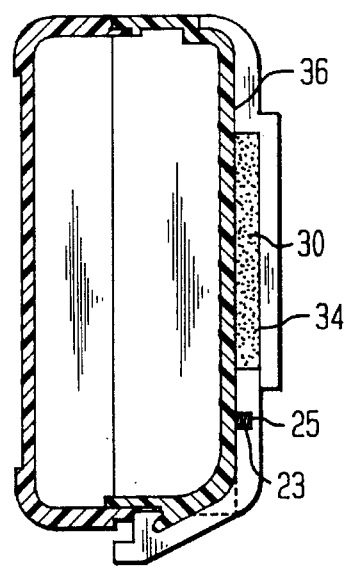
FIG. 3 is a cross sectional side view of device illustrated in FIG. 1.

As shown in FIGS. 1–3, holder body 10 is provided with suitable retaining means adapted to retain the dialing element within holder body channel 18. In the illustrated embodiment, the retaining means comprises a movable sidewall portion 20 which is adapted to engage a surface of the dialing element 12 in a force fitting manner when the dialing element is positioned within channel 18. As a further means of securing dialing element 12 within channel 18, the dialing element may optionally be provided with a suitable latching projection 22 that defines an upwardly facing slot 24. A corresponding detent means in the form of a projection 26 extends from movable sidewall portion 20 and has a downwardly depending tip adapted to enter slot 24 when dialing means 12 is positioned in channel 18. As would be apparent to those of ordinary skill, the holder body and dialing element should be constructed of a water resistant material and one or both components are preferably formed of a plastic material having sufficient elasticity to provide a force fitting engagement.

To separate dialing element 12 from the holder body 10, movable sidewall portion 20 is pushed away from the dialing element, whereupon the dialing element may be pulled out of channel 18 in the manner shown in FIG. 1. Once the detent projection 26 has been moved out of engagement with latching projection 22, the dialing element may also be removed by sliding it out of channel 18 or by pulling it upwardly in a direction perpendicular to the plane defined by base portion 14.

To assist in the uncoupling of dialing element 12 from the holder body 10, a suitable biassing means 23 such as a compressed coil spring may also be provided in a suitable recess 25 formed in channel 18. Upon disengagement of the retaining means, biassing means 21 acts upon on the bottom surface of dialing element 12 and forces the same out of channel 18.

Coupling means are provided for securing holder body 10 to a typical collar or other band member 30 adapted to be worn by a pet. It should be readily appreciated by those of ordinary skill in the art that any suitable fastener may be used to couple the holder body 10 to collar 30. By way of example, snaps, rivets, clips, adhesive bonding agents, or micro-hook and micro-loop fasteners may be employed. In the illustrated embodiment, the coupling means comprises a second channel 32 extending longitudinally along the center of base portion 14.

As shown in FIG. 3, when the dialing element 12 is retained within first channel 18, the section of collar 30 in second channel 32 is retained between the base surface 34 of the second slot and the bottom exterior surface 36 of dialing element 12. Accordingly, if it is desired that the holder body and dialing element be retained at a specific position on collar 30, the dimensions of channel 32 should be selected so that surfaces 34 and 36 exert sufficient force on the collar to prevent it from sliding therealong. Alternatively, channel 32 may be made deep enough to accommodate a variety of collar thicknesses and appropriate shims or inserts could be used to obtain the desired fit.

Figure 4:
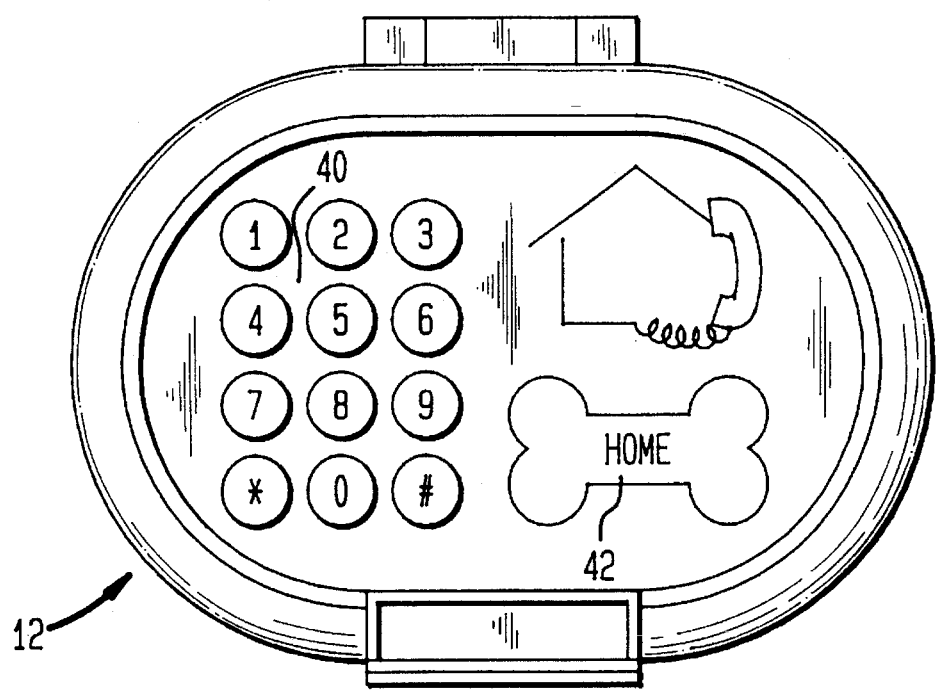
FIG. 4 is a plan view of the dialing element utilized in the present invention.
Figure 5:
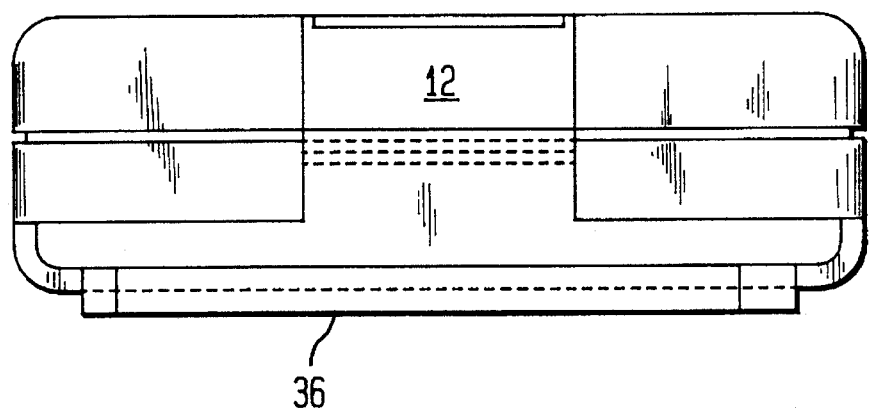
FIG. 5 is an elevation view of the dialing element shown in FIG. 4.

With reference to FIGS. 4 and 5, the construction and features of dialing element 12 will now be described. The purpose of dialing element 12 is to allow the finder of a lost pet to quickly establish telephone contact with the owner of that pet. Accordingly, the dialing element 12 is adapted to reproduce a desired dialing sequence corresponding to the telephone number of the pet owner. For this purpose, the dialing element may be provided with any suitable means for storing and reproducing a numerical dialing sequence. Preferably, the dialing element is equipped with a programmable memory (not shown) operable in a conventional manner to store the desired dialing sequence. To facilitate programming of the dialing element, a numeric keypad 40 is provided on the upper surface thereof. In a known manner, any desired dialing sequence may be programmed into memory by depressing the proper combination of keys.

If desired, the dialing element 12 may also be provided with a visual display means actuable to display the phone number of the owner. Thus, the finder of the lost pet could reach the owner by manually dialing the displayed number using the nearest available telephone. To minimize the delay in contacting the owner, however, dialing element 12 is equipped with means (not shown) for generating a communication signal corresponding to the programmed dialing sequence. It is preferred that the communication signal be a touch tone telephone signal so that contact can be established by simply holding the dialing element 12 near the handset of any telephone. It is believed that such signal generating means are well known, and for the purposes of understanding the present invention, a description of the same has therefore been omitted.

A pushbutton 42 or other manually actuable means is connected to the signal generating means to permit manual initiation of the dialing sequence communication signal. Thus, the user of the lost pet wearing the device need only detach the dialing element 12 from holder body 10 in the manner described earlier, position the dialing element near the handset of the nearest telephone, and actuate the signal generating means to dial the owner's telephone number.

While the foregoing has described one embodiment of an electronic dialing attachment for a pet collar, it is envisioned that further equivalent configurations, modifications, and alternate embodiments may be suggested to those knowledgeable in the art. For example, it is believed to be within the discretion of those of practicing the invention to reverse the positioning of the latching projection 22 and movable sidewall portion 20 so that the retaining means is a movable detent projecting from a side surface of the dialing means and adapted to engage the sidewall surface of the channel in a force fitting manner. Moreover, it is contemplated that any other means of detachably coupling the dialing element 12 to the holder body may be utilized. For example, the dialing element may be provided with a recess or aperture on its lower surface and the holder body may be equipped with expandable chuck means dimensioned to enter the aperture and retain the same in a force fitting manner. Suitable means provided on the holder assembly for retracting the chuck means would facilitate detachment of the dialing element 12 therefrom.

Accordingly, such alternate embodiments are to be construed as being within the spirit of the present invention, even though not explicitly set forth herein, the present invention being limited only by the content and scope of the claims appended hereto.

What is claimed is:

1. An assembly securable to a band member worn by a pet for use in returning a lost pet to its owner comprising:

dialing means for reproducing a desired dialing sequence corresponding to a telephone number of the owner;

holder means for securing said dialing means to the band member, wherein said holder means includes a channel; and retaining means for detachably coupling said dialing means to said holder means, wherein said retaining means includes a selectively operable sidewall portion, said selectively operable sidewall portion being dimensioned and arranged to engage a side surface of said dialing means in a force-fitting manner to secure said dialing means to said holder means when said holder means is positioned about the band member, said retaining means being operable in a first mode to couple said dialing means to said holder means and in a second mode to uncouple said dialing means from said holder means, wherein said dialing means may be separated from said holder means when uncoupled therefrom, said holder means being retainable upon the band member.

2. The device of claim 1, wherein said dialing means includes programmable memory means operable to store in memory said desired dialing sequence and means for generating a communication signal corresponding thereto.

3. The device of claim 1, wherein said dialing means includes means for initiating reproduction of said desired dialing sequence and means for generating a touch tone telephone signal corresponding to said desired dialing sequence in response to actuation of said initiating means, wherein said dialing means is removable from said holder means and adapted to be placed near a telephone handset whereupon said telephone number may be dialed by actuating said initiating means.

4. The device of claim 3, wherein said initiating means is a pushbutton.

5. The device of claim 1, wherein said dialing means further comprises means for inputting said desired dialing sequence.

6. The device of claim 5, wherein said inputting means is a numerical keypad.

7. The device of claim 1, wherein said retaining means further includes a detent formed on said selectively operable sidewall portion.

8. The device of claim 1, wherein said holder means further includes means for releasably coupling said holder means to said band member.

9. An assembly securable to a band member worn by a pet for use in returning a lost pet to its owner comprising:

dialing means for reproducing a desired dialing sequence corresponding to a telephone number of the owner;

holder means for securing said dialing means to the band member; and retaining means for detachably coupling said dialing means to said holder means, wherein said retaining means is a dent formed on a surface of said dialing means, said retaining means being operable in a first mode to couple said dialing means to said holder means and in a second mode to uncouple said dialing means from said holder means, wherein said dialing means may be separated from said holder means when uncoupled therefrom, said holder means being retainable upon the band member.

10. The device of claim 9, wherein said holder means includes a channel and said dent is selectively operable on said dialing means for engaging a surface of said holder means in a force fitting manner when said dialing means is positioned within said channel.

11. An assembly securable to a band member worn by a pet for use in returning a lost pet to its owner comprising:

dialing means for reproducing a desired dialing sequence corresponding to a telephone number of the owner;

holder means for securing said dialing means to the band member wherein said holder means includes a channel; and retaining means for detachably coupling said dialing means to said holder means, said dialing means is movable, in a linear direction perpendicular to a plane defined by the base of said channel, from a first mode to couple said dialing means to said holder means to a second mode to uncouple said dialing means from said holder means, wherein said dialing means may be separated from said holder means when uncoupled therefrom, said holder means being retainable upon the band member.

12. The device of claim 11, further comprising biassing means positioned within said channel for forcing said dialing means out of said channel when said retaining means is operated to uncouple said dialing means from said holder means.

13. An assembly securable to a band member worn by a pet for use in returning a lost pet to its owner comprising:

dialing means for reproducing a desired dialing sequence corresponding to a telephone number of the owner;

holder means for securing said dialing means to the band member wherein said holder means includes a first channel for receiving said dialing means and a second channel for receiving a portion of the band member; and retaining means for detachably coupling said dialing means to said holder means, said retaining means being operable to couple said dialing means to said holder means and to uncouple said dialing means from said holder means, wherein said dialing means may be separated from said holder means when uncoupled therefrom, said holder means being retainable upon the band member, the band member being retainable between a base portion of said second channel and a surface portion of said dialing means when said dialing means is positioned within said first channel.

14. An assembly securable to a band member worn by a pet for use in returning a lost pet to its owner comprising:

dialing means for reproducing a desired dialing sequence corresponding to telephone number of the owner;

holder means for releasably securing said dialing means to the band member, wherein said holder means includes a channel;

and retaining means for releasably coupling said dialing means to said holder means including a selectively operable sidewall portion of said channel being dimensioned and arranged to engage a surface of said dialing means in a force-fitting manner.

15. The device of claim 14, wherein said holder means further includes a projection extending from said selectively operable sidewall portion, said projection being movable to a locked position to retain said dialing means within said channel in said force fitting manner and an unlocked position to uncouple said dialing means from said holder means.

16. The device of claim 14, further comprising biassing means positioned within said channel for forcing said dialing means out of said channel when said retaining means is operated to uncouple said dialing means from said holder means.

17. The device of claim 14, wherein said dialing means includes programmable memory means operable to store in memory said desired sequence and means for generating a communication signal corresponding thereto.

18. The device of claim 14, wherein said dialing means includes means for initiating reproduction of said desired dialing sequence and means for generating a touch tone telephone signal corresponding to said desired dialing sequence in response to actuation of said initiating means, wherein said dialing means is removable from said holder means and adapted to be placed near a telephone handset whereupon said telephone number may be dialed by actuating said initiating means.

19. The device of claim 14, wherein said dialing means further comprises means for inputting said desired dialing sequence.

* * * * *